March 28, 1939. J. H. WILSON 2,151,881
DRILLING RIG TRANSMISSION
Filed June 17, 1935 4 Sheets-Sheet 1

Inventor
JOHN H WILSON.
Jesse R. Stone
Lester B. Clark
By
Attorneys.

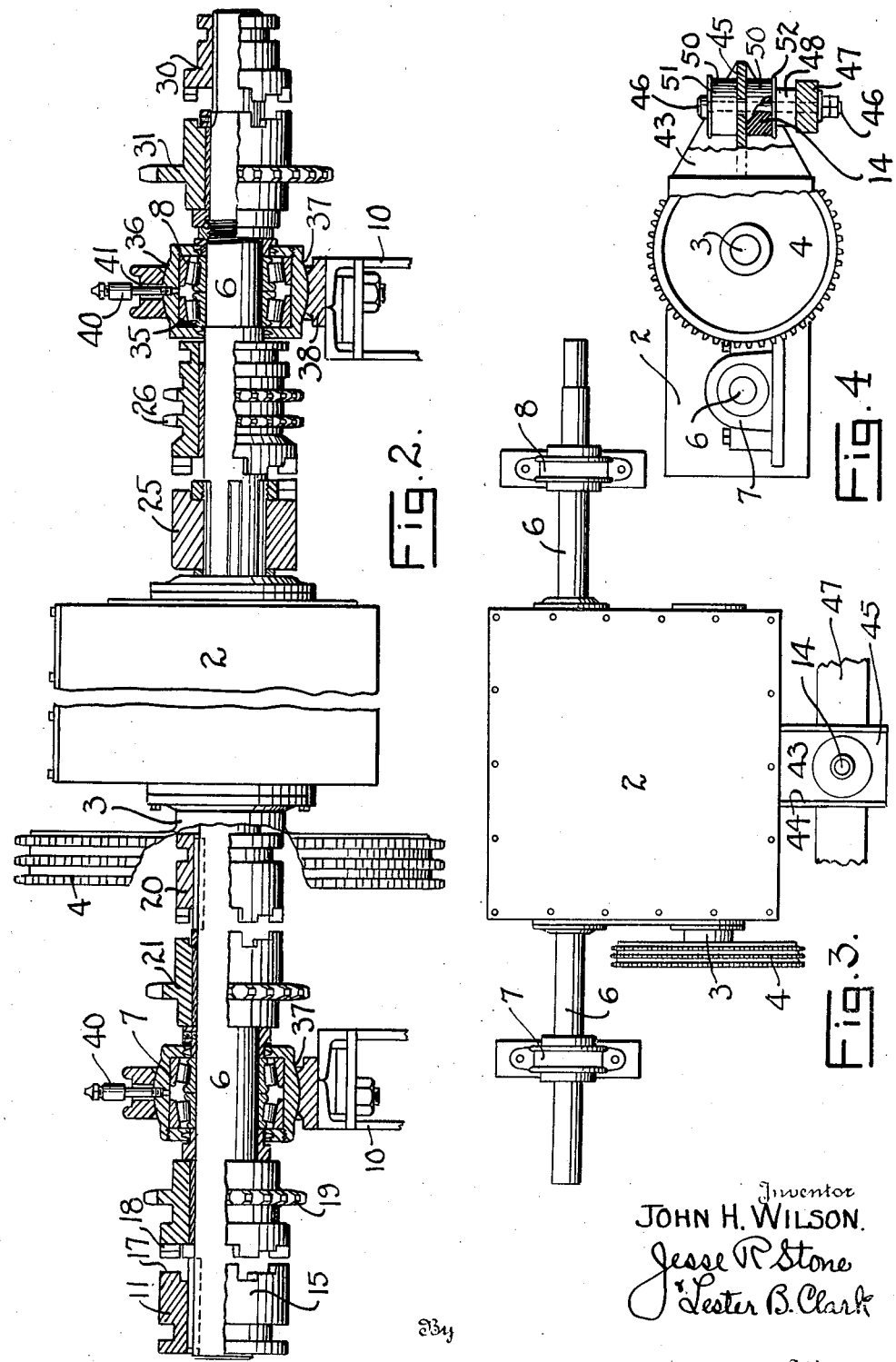

March 28, 1939.  J. H. WILSON  2,151,881
DRILLING RIG TRANSMISSION
Filed June 17, 1935   4 Sheets-Sheet 3

Inventor
JOHN H. WILSON.
By Jesse R. Stone
Lester B Clark
Attorneys.

Patented Mar. 28, 1939

2,151,881

UNITED STATES PATENT OFFICE 2,151,881

DRILLING RIG TRANSMISSION

John Hart Wilson, Wichita Falls, Tex.

Application June 17, 1935, Serial No. 26,980

6 Claims. (Cl. 74—411)

The invention relates to an improvement in transmissions, and particularly of the heavy duty type where abrupt loads are applied and heavy stresses must be transferred.

The present invention will be described particularly in connection with its combination with a well drilling rig, but it is to be distinctly understood that it may be applied in combination with other mechanisms wherever desired.

With the advent of combustion engines as a source of power for well drilling rigs, it is of advantage to provide a transmission so that the power may be applied to the various pieces of equipment at different speed ratios and it is with a view of arranging a simple and economical transmission which is sturdy in construction and capable of providing indefinite service that the present transmission has been devised.

It is one of the objects of the invention to provide a transmission which will embody an input and output shaft for the power and wherein the transmission is supported by the output shaft.

Another object of the invention is to provide a transmission wherein a 3-bearing support is provided for the shaft so that heavy stresses may be transferred.

Another object of the invention is to provide a seal about the shaft bearings in a transmission so that metallic chips and other foreign material cannot be forced into the bearings.

Another object of the invention is to provide a 3-point support transmission for drilling rigs wherein the output shaft constitutes two points of the support.

Still another object of the invention is to provide a resilient bearing for one of the three points of support for a well rig transmission.

Still another object of the invention is to provide a transmission in combination with a supporting shaft and resilient support so that there will be no twist or torque applied to the shaft bearing.

Still another object of the invention is to provide a chain drive transmission wherein the chains are enclosed and subjected to an oil bath during operation.

Still another object of the invention is to provide in a transmission device a clutch arrangement wherein the clutch is applied to the larger sprocket of each pair of drive and driven sprockets regardless of whether it is the drive or the driven sprocket which is the larger in order to avoid excessive chain speeds, as well as wear on the chains and sprockets, and the shock of starting to the gear.

Another object of the invention is to provide a 3-point support for a transmission wherein the torque reaction of the output shaft upon absorbing the load is transferred to the transmission box and absorbed by a flexible bearing thereon.

Another object of the invention is to provide a full floating transmission housing so that the housing may align itself with the output shaft when the loads are absorbed.

Another object of the invention is to provide a ball joint housing for supporting the transmission output shaft.

Still another object is to employ a chain and sprocket arrangement in a transmission so that chips from the clutches or other foreign material will not interfere with the operation of the transmission.

Another object of the invention is to provide a chain drive transmission so that in event one of the chains becomes broken it will merely drop out of position and other speed ratios may be employed temporarily in transmitting the power to the well rig.

Another object of the invention is to provide an efficient transmission for well rigs wherein the power is transmitted by roller chains running on cut steel hardened sprockets in an oil bath so that the parts are completely protected from grit and sand.

Other and further objects of the invention will be readily apparent when the following description is considered in connection with the accompanying drawings wherein:

Fig. 2 is a side elevation of the output shaft taken from the rear of the transmission with certain parts of the transmission housing broken away and certain parts of the bearings and clutches in section.

Fig. 3 is a top plan view of the general arrangement of the transmission and its bearings and supports.

Fig. 4 is a side elevation looking at the right-hand side of Fig. 3 with certain parts of the flexible support shown in section to illustrate its construction.

Figure 7:
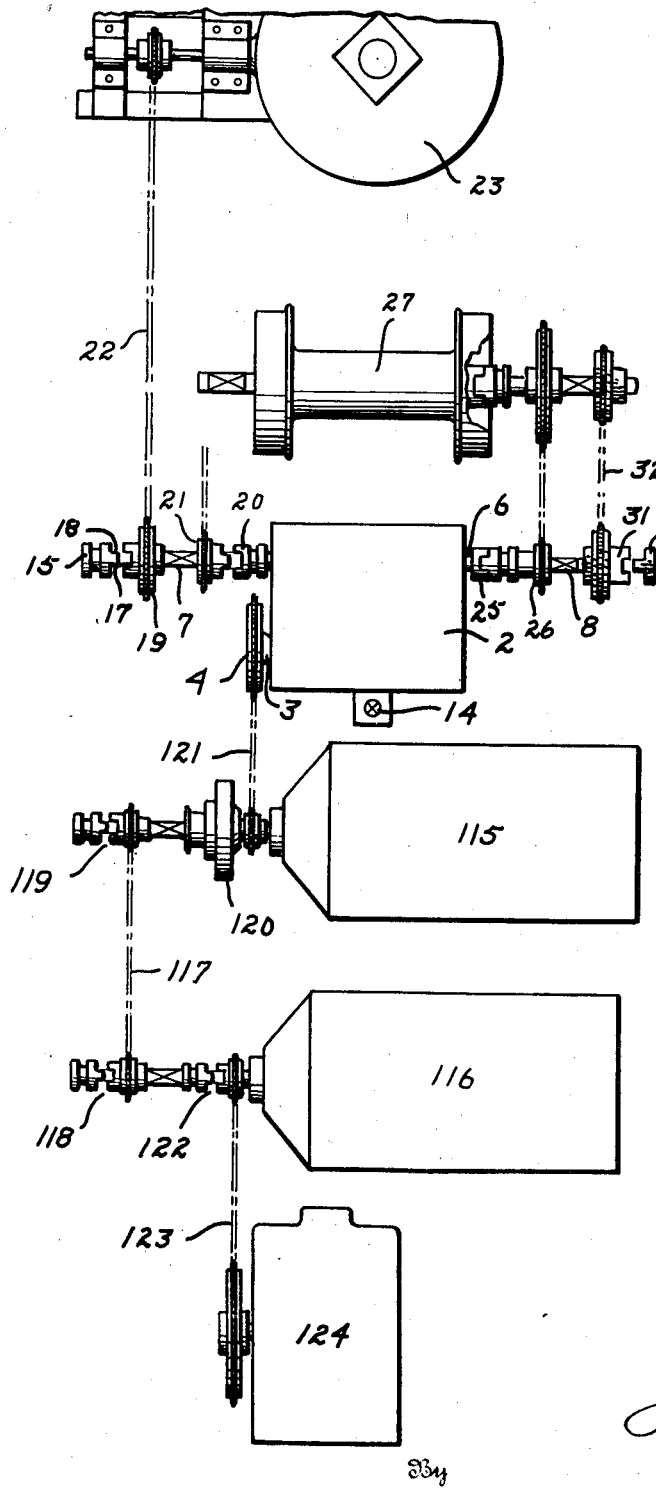
Fig. 7 is a schematic view illustrating a combination embodying the present invention.

In Fig. 7 is shown a general arrangement of the drilling equipment which will be used, particularly embodying the arrangement of the combustion engines, the slush pumps, the draw-works, and the rotary table for turning the drill stem. The present transmission is arranged to be incorporated in different combinations in order to obtain the desired speed ratio and power transfer between the combustion engines and the draw-works and rotary table. As previously stated, however, the transmission may be applied in other combinations of equipment but the combination illustrated in Fig. 7 presents a preferred embodiment including engines 115 and 116, which are interconnected by means of a chain 117 and cooperating clutches 118 and 119. A master clutch 120, mounted upon the shaft of the draw works motor 115, is so constructed that power from either or both of the engines 115, 116 may be transmitted through chain 121 to transmission 2, more fully described hereafter. From the foregoing, it is apparent that motors 115 and 116 may be used singly or in tandem. At the same time, motor 116 may be connected through clutch 122 and chain 123 to the slush pump 124. By means of the combination thus generally described the advantages of the invention are realized. More specific features of the invention will be apparent by reference to the remaining figures of the drawings in which Fig. 3 shows the transmission 2 as having an input shaft 3 mounted therein. A suitable drive wheel or sprocket 4 is mounted upon the end of the input shaft 3 in order to receive the driving power from the source through drive chain 121.

The interior of the transmission 2 is arranged to transfer the power to the output shaft 6 which is illustrated in Fig. 3 as extending from either side of the housing 2. This output shaft 6 is arranged for support in the bearings 7 and 8 which are seen spaced on either side of the transmission 2 and may be mounted upon a suitable foundation portion 10 which may or may not be a part of the assembly. It is intended that the transmission 2 will have but a 3-point suspension. Two of these points are the bearings 7 and 8 while the third point is the flexible support bearing 14 which is best seen in top plan view in Fig. 3 and in side elevation in Fig. 4. The transmission housing 2 is thus floating on these three bearings and is naturally capable of limited movement in order to accommodate itself to the stresses applied to the shafts 3 and 6.

Figs. 2 and 7 show an assembly view of the output shaft 6 with the bearings 7 and 8 supporting the shaft on the foundation 10. The housing 2 has been broken at the center and the parts arranged so as to illustrate the clutches and driving gears. The input drive wheel 4 has been broken away to show the detail of the shaft and clutches.

It seems obvious that the shaft 6 will be rotated by the chain drives inside of the transmission 2 and will impart rotation to the clutch 15 which is splined at 16 on the end of the shaft 6. The teeth 17 engage complementary teeth 18 on the drive sprocket 19 so that power may be transmitted through chain 22 to the rotary drive table 23 for turning the drill stem. The various speed ratios will be obtained by operation of the transmission gearing so that the sprocket 19 may be rotated at different speeds.

A somewhat similar clutch 20 and drive sprocket 21 are also arranged on the shaft 6 closely adjacent the housing 2 and this sprocket may be used to drive the cat-head on the draw-works so that the tool joints may be broken out or other pieces of equipment hoisted as desired. On the right hand side of Figs. 2 and 7 a clutch 25 and sprockets 26 are arranged for operation of the draw-works drum 27 at a low speed. This operation is obtained by shifting of the sprockets 26 to engage the clutch 25.

The outer end of the shaft 6 on the right hand side carries the high speed jaw clutch 30 which engages the high speed sprocket 31 in order to transmit power through chain 32 to the draw-works when high speed or hoisting operations are to be performed.

Particular attention is directed to the bearings 7 and 8 which support this output shaft 6 as best seen in Fig. 2. These bearings include the roller bearing supports 35 which are carried in a bearing housing 36. This housing has a convexly curved outer surface 37 which is received in the bearing support 38 mounted on the foundation 10. With this construction the bearing 35 is primarily carried by the shaft 6 and is arranged for more or less oscillation or movement relative to the bearing support 38. It will be noted that the oil cup 40 is permitted an area 41 in which to move so that any vibration imparted to the shaft 6 or any misalignment of the parts can be accommodated by relative movement between the bearing housing 36 and the bearing support 38.

Attention is directed to the fact that the sprockets 19 and 21 and 26 and 31 are spaced closely adjacent the bearing supports 7 and 8 respectively, so that the bending moment applied to the shaft 6 is a minimum. The result of such construction permits a smaller diameter shaft and a consequent reduction in cost and weight, as well as the size of the gears and bearings.

It will be particularly understood that when the loads are applied to the sprockets 19, 21, 26, and 31 that as a general rule there is considerable shock in connection therewith, because in many instances enormous loads must be transmitted or considerable power applied to the draw-works, cat-head or the rotary table drive in order to accomplish the desired result. As a general rule the draw-works or other equipment will be stationary when the clutch is engaged, whereas the clutch and other parts of the transmission are all rotating. The sudden engagement of the clutch thus throws an enormous load on the transmission. Needless to say, therefore, that enormous stresses are applied to the output shaft 6 not only as a torque, but as a pulling and bending moment as well.

If the transmission were anchored, as is the usual practice, so that it served as a support for the shaft, then the shaft and bearings in the transmission which supported it would necessarily transmit all shocks and loads to the transmission and would not be adjacent the point of application of the load at the sprockets 19, etc. In the past, transmissions for drilling rigs have been heavy and cumbersome but the weight was required in order to obtain sufficient strength to withstand the rough usage and unexpected stresses required. In order to reduce the size of the shaft and the bearings in the transmission, as well as the proportionate size of all the other parts, the shaft is mounted directly in the foundation bearings. Thus no load or shock ever reaches the transmission housing except the resistance to rotation. A large diameter shaft is therefore not required because the loads are applied to the drive sprockets which are as close as possible to the bearings 7 and 8.

In Fig. 3 it will be noted that the transmission housing 2 is supported on the shaft 6 and is free to flex and move with the shaft when it is subjected to strains because of the fact that the transmission housing 2 has but a single point of anchorage and that is through the flexible bearing 14. The bearing anchor is best seen in Figs. 3 and 4, including the brackets 43 which are fixed to the housing 3. These brackets are preferably in the form of channels with the side braces 44 which support the central plate 45. A shaft 46 projects through this plate and through a suitable foundation member 47 which may be a part of the foundation 10 or of the rig structure. A suitable spacer 48 may be provided for adjustment of the proper level of the housing 2.

A pair of resilient bumpers or buffers 50 are provided and are spaced on opposite sides of the central plate 45. The caps 51 and 52 retain these buffers in position so that the plate 45 may have limited movement with respect to the shaft 46 which is firmly anchored in position on the foundation 47. The plate 45 may have a limited rocking action as well as vertical movement so that any vibration or movement of the shaft 6 and the housing 2 will be absorbed by these buffers 50. They may be of rubber or any suitable material.

From the foregoing it will be apparent that the entire transmission is supported at the points 7, 8, and 14 and is therefore capable of limited movement in order to equalize the vibration and strains imparted thereto.

Figure 1:
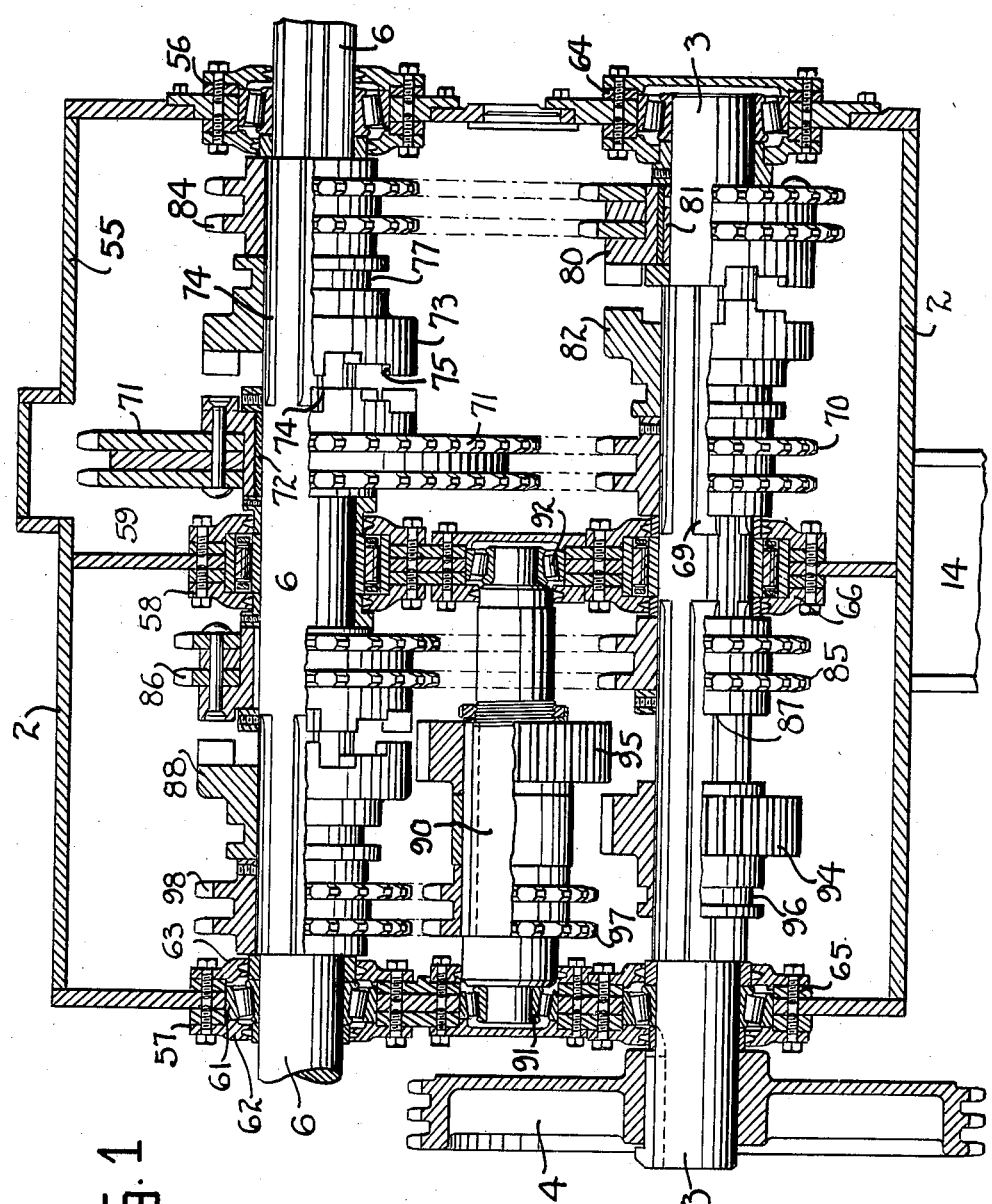
Fig. 1 is a transverse sectional view through the transmission housing looking down on the shafts and gears with the bearings in section.

The internal construction of the transmission is best seen in Fig. 1 where the transmission case 55 has been broken away. The casing 55 is supported on the output shaft 6 by the bearings 56 and 57 and is supported intermediate the ends of the casing by the bearings 58 which is mounted in the central portion 59. In this manner a 3-bearing support is provided on the shaft so that the transmission casing 55 will be caused to move with the shaft. Particular attention is directed to the arrangement of the bearings which support the casing 55 on the shaft and it will be observed that the bearing cup 61 is confined between the outer plate 62 and the inner plate 63. With this construction no particles of metal, chips from the clutches, or other foreign material may pass into the bearing structure and with the pressure greasing connections applied to the bearings they may be maintained in proper lubricated condition so that they will wear indefinitely. Either of the caps may be readily removed and the bearing inspected at will.

One of the primary advantages of the present transmission lies in the fact that sprockets are used so that any chips or particles of metal will not cause damage as they do in gear type transmissions. The clutches are of course located in the transmission and the broken off corners thereof will be carried around with the oil so that the chains and sprockets of the present transmission have been devised to eliminate this hazard.

The input shaft 3 is carried by a similar set of bearings 64, 65, and 66, so that it has a 3-bearing support the same as the shaft 6.

The drive wheel 4 will be rotated to impart rotation to the various sprocket arrangements in the transmission and it will be noted that the low speed drive sprockets 70 are splined to the shaft at 69 so that they rotate with the low speed shaft at all times. A suitable roller chain will be applied to these cut steel sprocket wheels 70 in order to transmit power to the low speed driven sprocket 71. This sprocket is mounted on the bearing sleeve 72 so that it may rotate independently of the output shaft 6. When the output shaft 6 is to be driven at a low speed the clutch 73 which is splined at 74 on the output shaft will be moved laterally so that the jaws 75 will engage the complemental jaw 76. The clutch 73 will be moved by a suitable clutch collar engaging in the groove 77.

The high speed gear arrangement is seen in the right hand side of Fig. 1, and the high speed drive sprocket 80 is shown as mounted on a rotating bushing 81 so that this high speed sprocket 80 will not be caused to rotate with the shaft 3 when it is engaged by the high speed clutch 82 which operates in a manner similar to the clutch 73. The clutch 82 is splined on the shaft 3 for operation by a clutch collar 110. See Fig. 6. The high speed driven sprockets 84 are splined on the output shaft 6 so that they are caused to rotate therewith at all times. In view of the fact that they will only rotate at low speeds, however, there is no excessive wear on the chains and sprockets. In this manner regardless of whether the high speed or the low speed is being used the low speed sprockets 70 and 71 and the high speed sprockets 80 and 84 will only rotate at a low speed and a material saving is in this manner obtained.

The intermediate or secondary speed is transferred from the input shaft 3 to the output shaft 6 by means of the drive sprockets 85 and the driven sprockets 86. The same arrangement is applied to the secondary speed as is applied to the low speed 70, namely, the drive sprockets 85 are splined at 87 on the input shaft, whereas the driven sprockets 86 are free to rotate on the output shaft 6. The clutch 88 is splined to the output shaft so that when the output shaft is running at high speed the secondary speed sprockets will rotate only at the speed of the input shaft.

The reverse speed is obtained by the provision of a jackshaft 90 which is mounted in the bearings 91 in the end partition and 92 in the center partition 59. Power is transmitted from the input shaft 3 by means of a drive gear 94 to a driven gear 95 which is keyed on the jackshaft 90. The drive gear 94 is splined on the input shaft 3 and is slidable by means of a clutch collar engaging in the groove 96. In this manner the gears 94 and 95 will mesh together only when in actual use to impart rotation to the reverse drive sprocket 97 which is chained to the reverse driven sprockets 98 which are in turn splined on the output shaft 6. Because the jackshaft is interposed between the input and output shaft the direction of rotation of the output shaft 6 will be in this manner reversed. The jackshaft will, of course, be caused to rotate in a reverse direction when the output shaft 6 is being used for normal operations. This arrangement permits the reverse gears to be out of mesh during practically the entire time because the reverse may only be used on a very few occasions during the drilling of the well, so that a further decrease in the power losses and wear on the parts is obtained. The jackshaft 90 is quite long with the gears 94 and 95 adjacent the center so that if chips should pass between the gears the flexibility of the shaft would accommodate the excess strain and avoid material damage to the gears, shaft, or bearings.

Figure 5:
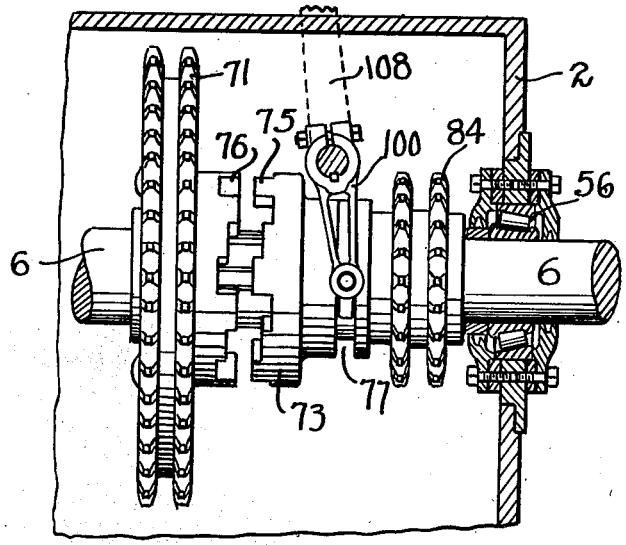
Fig. 5 is a broken detail sectional view showing the arrangement of the clutch operating mechanism.
Figure 6:
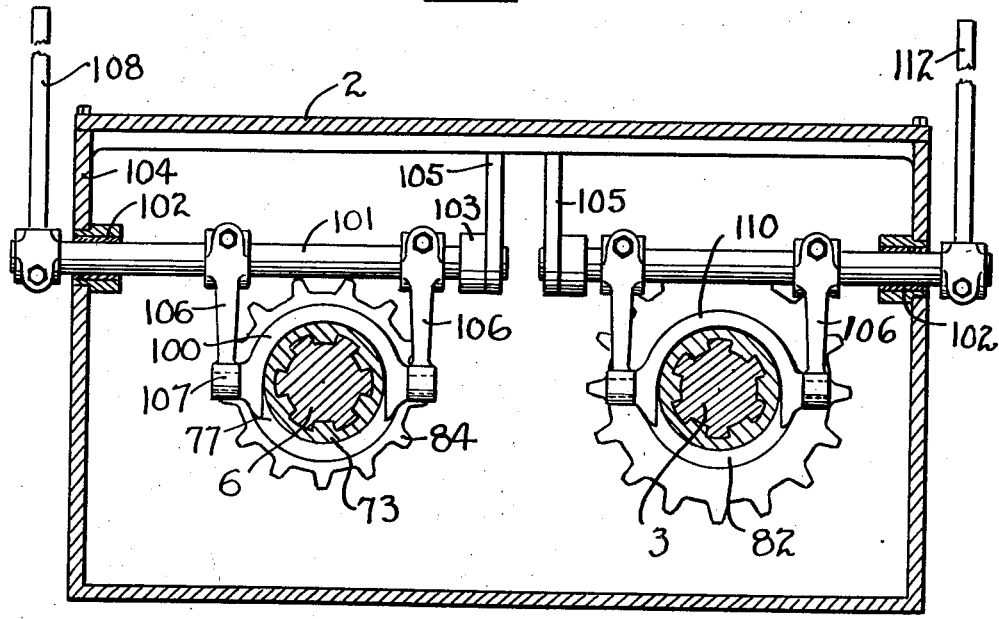
Fig. 6 is a transverse sectional view showing the clutch shifting mechanism.

Figs. 5 and 6 are broken sectional views and show the arrangement of the clutch collars for operating the clutches. In Fig. 5 the high speed driven sprockets 84, the output shaft 6, the bearings 56 and the low speed driven sprocket 71 are identically the same as shown in Fig. 1. The clutch 73 shows the clutch collar 100 disposed in the groove 77 so that the clutch 73 may be moved laterally to engage the jaws 75 and 76.

Fig. 6 shows a sectional view which is equivalent of a sectional view looking toward the left in Fig. 1 and the splined arrangement of the clutch 73 on the output shaft 6 has been illustrated. The high speed driven sprocket 84 is shown directly in back of the clutch mechanism.

The clutch collar 100 is shown as being disposed in the groove 77 but is supported by a cross shaft 101 which is in turn mounted for rocking movement in the bearing 102 and the bearing 103, the former being positioned in the wall 104 of the transmission housing 2 and the latter being supported on a brace 105 depending from the brace which is adjacent the top of the transmission box.

Fixed to this cross shaft 101 are the depending arms 106 to which the clutch collar 100 is pivoted at 107.

As this shaft 101 is rocked back and forth the clutch 73 will be caused to slide along the output shaft 6. The rocking movement of this shaft 101 is effected by the upstanding lever 108, and it is to this lever that suitable connection will be made with the clutch handle which is to be operated by the driller. Such connection may be in the form of a rod or other suitable connection.

The adjacent clutch collar 110 which operates the high speed clutch 82 is also seen in Fig. 6, and its construction and operation is identical with the clutch collar 100 previously described. The lever 112, however, serves to operate this clutch collar 110 in order to engage and disengage the high speed transmission ratio.

The mechanism and clutch collars for operating the intermediate and reverse sprockets are constructed and arranged similarly to those described.

Particular attention is directed to the multiple arrangement of the sprockets so that multiple chain drives can be utilized. Twin sprockets have been shown, but more may be used. These chains will preferably be of the roller type of a good quality so that they will afford a maximum of service when used in this transmission. The sprockets are of cut steel with hardened faces. The transmission casing 55 will be partially filled with oil or a suitable lubricant so that all of the parts will run in oil. The casing is completely sealed so that the drilling mud or other foreign matter will be excluded.

The jaw clutches are preferably formed with a double step and a plurality of teeth. Such construction is of advantage in transmitting heavy loads and where the driving faces are undercut slightly a very satisfactory construction is obtained which permits reverse driving if necessary.

As an illustration, but not a limitation, as to how the transmission operates, suppose the input shaft 3 rotates at the rate of 340 revolutions per minute. The low speed gear 70 would then be of a size so that there would be 18 sprocket teeth thereon, while the low speed driven gear 71 would carry 39 teeth. This would impart a rotation of about 157½ revolutions per minute to the output shaft. The high speed sprocket 84 would, of course rotate at this same speed and with a tooth ratio of 17 to 22 with the high speed sprocket 80 would cause such sprocket to rotate at about 122 R. P. M. The wear on the parts is thus almost negligible as compared with the hook-up where the clutches were connected to the smaller sprockets. In the latter case if the input shaft rotated at 340 as before and the clutch were on the small sprocket 70 then the output shaft would turn at 440 R. P. M. and the high speed sprocket at about 950 R. P. M. The comparison of the improved arrangement of this invention seems obvious and the saving in power and friction losses as well as wear on the parts is considerable.

With the intermediate transmission speeds the drive sprockets 85 would carry 17 teeth while the intermediate driven sprockets 86 would carry 22 teeth, imparting a speed of about 300 revolutions per minute to the output shaft 6. The high speed sprockets 80 would carry 22 teeth while the high speed driven sprockets 84 would carry 17 teeth thus giving a speed of about 515 revolutions per minute to the output shaft 6.

With the reverse speed, if the engaging gears 94 and 95 both carried 32 teeth and the reverse drive sprocket 97 carried 14 teeth and the reverse driven sprocket 98 carried 18 teeth then the output shaft would be driven at about 310 revolutions per minute in reverse speed.

Attention is also directed to the simplification of the arrangement of the shafts and the center to center spacing thereof. It is practically an engineering impossibility to design the center to center spacing of two shafts with chain and sprocket drives where there are to be three different speed ratios. This difficulty arises because it is desirable to use the same size and pitch of chain on all the drives in the transmission and still obtain definite ratios between the various drives which are assumed to be desirable. This problem has been solved in the present arrangement by using the same size sprockets on both the high and intermediate ratios but reversing the large and small sprockets.

It has been found in actual practice in transmissions of this type that the chain drives when enclosed and running in oil are very superior to gears because of the fact that the gears in order to transmit the enormous loads must be of considerable size and cannot operate as satisfactorily over long periods of time as can the chain drives.

What is claimed is:

1. In a well driving rig, in combination, an elongated horizontally disposed work or output shaft, two fixed bearings supporting the shaft for rotation, said bearings being spaced apart a sufficient distance to permit the shaft to flex therebetween when subjected to a force applied normally to the shaft, a member mounted upon the shaft between and spaced from each of said bearings, the shaft and member being relatively revoluble about the axis of the shaft, a device connecting a portion of said member remote from said shaft to a fixed object and whereby the angular movement of the member about the shaft is limited and cushioned without interfering with the movement of said member with the shaft when the shaft flexes, an element rotatably mounted on said member and spaced from said shaft, said element being adapted to be flexibly connected to a source of power so as to remain operative for all positions of said member, means for operatively connecting said element to said shaft whereby the shaft may be driven, means mounted on the shaft adapted to be flexibly connected to a device to be operated, and clutch mechanism for operatively connecting said last mentioned means to and disconnecting it from said shaft, the arrangement being such that shocks resulting from the loading of the shaft while rotating will be minimized and cushioned and shaft flexure may occur without disturbing the driving connection between the power source and device to be operated.

2. In a well drilling rig, in combination, an elongated horizontally disposed work or output shaft, two fixed bearings supporting the shaft for rotation, said bearings being spaced apart a sufficient distance to permit the shaft to flex therebetween when subjected to a force applied normally to the shaft, a member mounted upon the shaft between and spaced from each of said bearings, the shaft and member being relatively revoluble about the axis of the shaft, a device connecting a portion of said member remote from said shaft to a fixed object and whereby the angular movement of the member about the shaft is limited and cushioned without interfering with the movement of said member with the shaft when the shaft flexes, an element rotatably mounted on said member and spaced from said shaft, said element being adapted to be flexibly connected to a source of power, so as to remain operative for all positions of said member, means for operatively connecting said element to said shaft whereby the shaft may be driven, means mounted on the shaft intermediate said member and one of said bearings adapted to be flexibly connected to a device to be operated, and a clutch mechanism supported on the shaft adjacent said means and also intermediate said member and the aforesaid bearing for operatively connecting said last mentioned means to and disconnecting it from said shaft, the arrangement being such that shocks resulting from the loading of the shaft while rotating will be minimized and cushioned and shaft flexure may occur without disturbing the driving connection between the power source and device to be operated.

3. In a well drilling rig, in combination, an elongated horizontally disposed work or output shaft, two fixed bearings supporting the shaft for rotation, said bearings being spaced apart a sufficient distance to permit the shaft to flex therebetween when subjected to a force applied normally to the shaft, a member mounted upon the shaft between and spaced from each of said bearings, the shaft and member being relatively revoluble about the axis of the shaft, a device connecting a portion of said member remote from said shaft to a fixed object and whereby the angular movement of the member about the shaft is limited and cushioned without interfering with the movement of said member with the shaft when the shaft flexes, an element rotatably mounted on said member and spaced from said shaft, said element being adapted to be flexibly connected to a source of power so as to remain operative for all positions of said member, means for operatively connecting said element to said shaft whereby the shaft may be driven, means mounted on the shaft and on the opposite side of one of said bearings from said member which is adapted to be flexibly connected to a device to be operated, and a clutch mechanism supported on the shaft adjacent said means and on the same side of said bearing as said means, for operatively connecting said last mentioned means to and disconnecting it from said shaft, the arrangement being such that shocks resulting from the loading of the shaft while rotating will be minimized and cushioned and shaft flexure may occur without disturbing the driving connection between the power source and device to be operated.

4. In a well drilling rig, in combination, an elongated horizontally disposed work or output shaft, two fixed bearings supporting the shaft for rotation, said bearings being spaced apart a sufficient distance to permit the shaft to flex therebetween when subjected to a force applied normally to the shaft, a member mounted upon the shaft between and spaced from each of said bearings, the shaft and member being relatively revoluble about the axis of the shaft, a device connecting a portion of said member remote from said shaft to a fixed object and whereby the angular movement of the member about the shaft is limited and cushioned without interfering with the movement of said member with the shaft when the shaft flexes, an element rotatably mounted on said member and spaced from said shaft, said element being adapted to be flexibly connected to a source of power so as to remain operative for all positions of said member, means for operatively connecting said element to said shaft whereby the shaft may be driven, two sprockets rotatably mounted on the shaft to one side of said member, said sprockets being positioned closely adjacent and on opposite sides of one of said bearings and each being adapted to be flexibly connected to a device to be operated, and a clutch mechanism closely associated with each sprocket for operatively connecting said sprockets, respectively, to said shaft and disconnecting them therefrom, the arrangement being such that shocks resulting from the loading of the shaft while rotating will be minimized and cushioned and shaft flexure may occur without disturbing the driving connection between the power source and device to be operated.

5. The combination set forth in claim 1 in which said member comprises a casing for gearing equidistantly spaced from said shaft bearings and said element comprises a sprocket rotatably supported on said casing.

6. The combination set forth in claim 1 in which said member comprises a casing for gearing of large size and mass and said element comprises a sprocket fixed on a shaft which is rotatably supported in said casing and disposed parallel to said output shaft, the gearing carried by said member serving to operatively connect said shafts.

JOHN HART WILSON.